United States Patent [19]

Kuan

[11] Patent Number: 5,165,632
[45] Date of Patent: Nov. 24, 1992

[54] TRAY MOUNTING ASSEMBLY FOR A WHEELED CARRIAGE

[76] Inventor: Min-Yuan Kuan, No. 35-1, Pei-Hui, Hui-Kuei T'Sun, Shui-Shang Hsiang, Chiaya Hsien, Taiwan

[21] Appl. No.: 816,487

[22] Filed: Jan. 3, 1992

[51] Int. Cl.⁵ .............................................. A47K 1/04
[52] U.S. Cl. .................. 248/129; 248/218.4; 248/294
[58] Field of Search .................. 248/129, 218.4, 188.4, 248/294, 291

[56] References Cited

U.S. PATENT DOCUMENTS

| | | | |
|---|---|---|---|
| 1,806,773 | 5/1931 | Waters | 248/129 X |
| 1,908,470 | 5/1933 | Beuttner | 248/291 X |
| 2,846,570 | 8/1958 | Harling | 248/291 X |
| 2,937,840 | 5/1960 | Fleischman | 248/291 |
| 4,932,628 | 6/1990 | Pacheco | 248/129 X |
| 4,971,286 | 11/1990 | Silham | 248/129 X |

Primary Examiner—David M. Purol

[57] ABSTRACT

The tray mounting assembly includes a U-shaped frame with two free ends, each of which has a hole aligned with the other, and a plate having a front wall with a mounting shaft extending upward from the front and a rear wall on which a lug is mounted. The plate is pivotally connected to the U-shaped frame.

4 Claims, 6 Drawing Sheets

TRAY MOUNTING ASSEMBLY FOR A WHEELED CARRIAGE

BACKGROUND OF THE INVENTION

1. Field of Invention

This invention relates to a tray mounting assembly for holding a tray thereon so as to keep disassembled parts, more particularly to one mounted adjacent to a top end of an upright stand of a load-lifting wheeled carriage which is especially used for lifting an engine above the ground for under going repair.

2. Description of the Related Art

Referring to FIGS. 1 and 2, a wheeled carriage (1) is shown to comprise a base assembly (12) and an upright stand (10) which has a top portion with a piece of load-carrying equipment (4) on one side and a tray carrying rod (2) on the other side positioned slightly below said load carrying equipment (4). A tray (3) can be mounted on the tray carrying rod (2) so that after a load, such as an engine E, is mounted on the load carrying equipment (4), some spare parts, like nuts, bolts and spring which are disassembled from the engine can be placed in the tray (3) while a mechanic is working on the engine.

The drawback of the wheeled carriage is that once the load is mounted on the load-carrying equipment (4), the upright stand (10) will incline forward due to the weight of the load. The tray carrying rod (2) also inclines. As a result, those small articles placed in the tray will spill over from the tray (3). The inclined tray carrying rod (2) can not be adjusted back vertically as in the initial stage because the tray carrying rod (2) is fixedly welded on the upright stand (10).

SUMMARY OF THE INVENTION

It is therefore an object of the present invention to provide a tray mounting assembly which is to be attached to the upright stand of the wheeled carriage which mounting assembly can be adjusted in any angular position with respect to the upright stand so as to retain the tray placed thereon in a horizontal plane.

Accordingly, a tray mounting assembly of the present invention is to be attached to an upright stand of a load carrying wheeled carriage and includes a tray, a substantially U-shaped frame having two free end each of which has a hole aligned with the other, and a plate which includes a front side with a mounting shaft extending upward therefrom and a rear side with a lug horizontally provided thereon. The plate also has two threaded holes formed thereon one above, the other below the lug. The U-shaped frame is first of all provided around the upright stand in such a manner that the two free ends of the same protrude beyond the upright stand. The lug of the plate is provided between the two free ends of the U-shaped frame. A bolt is inserted, passing through the two holes of the two free end of the U-shaped frame and though the lug of the plate to connect pivotally the former and the latter together. A pair of threaded bolts, each of which having a free end, is threaded through each threaded hole of the plate to abut against the upright stand, thus holding said U-shaped frame and said plate on the upright stand. A tray is mounted to the tray carrying shaft of the plate.

BRIEF DESCRIPTION OF THE DRAWINGS

Other features and advantages of the present invention will become apparent in the following detailed description, including drawings, all of which show a non-limiting, form of the present invention, and of which.

DETAILED DESCRIPTION OF THE PREFERRED EMBODIMENT

Figure 1:
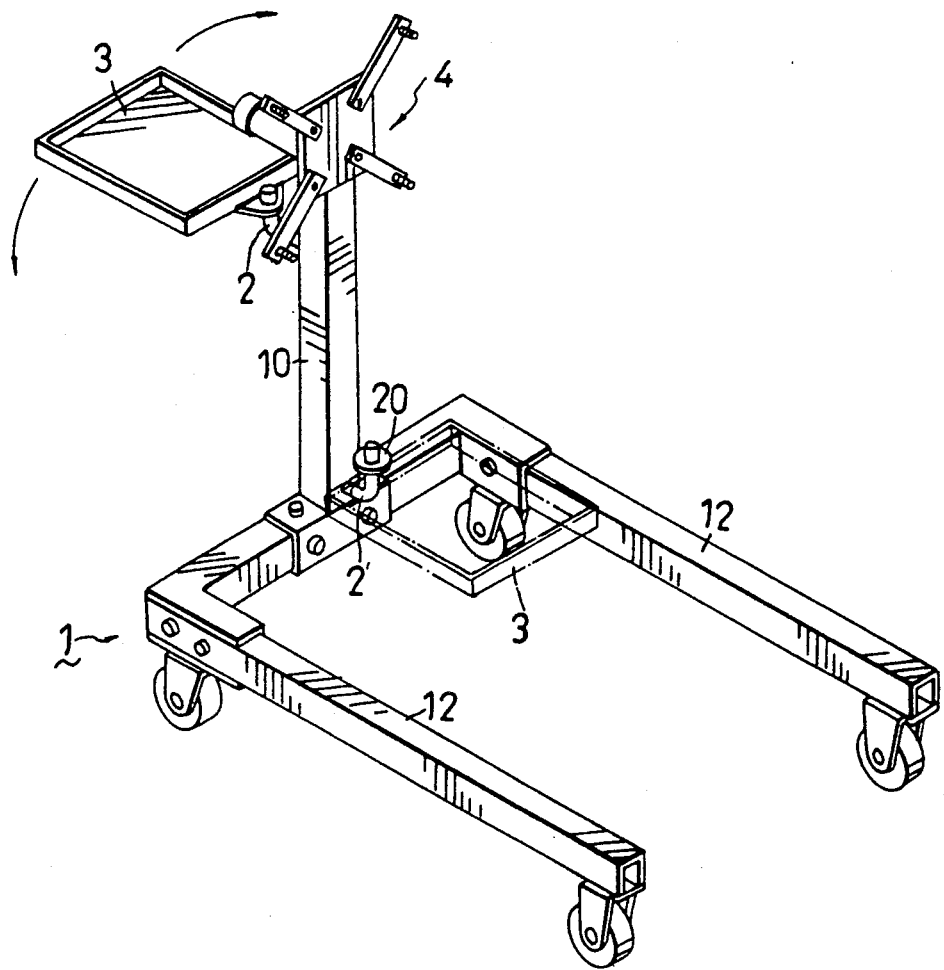
FIG. 1 shows a load carrying wheeled carriage having a tray mounting assembly of the prior art.
Figure 2:
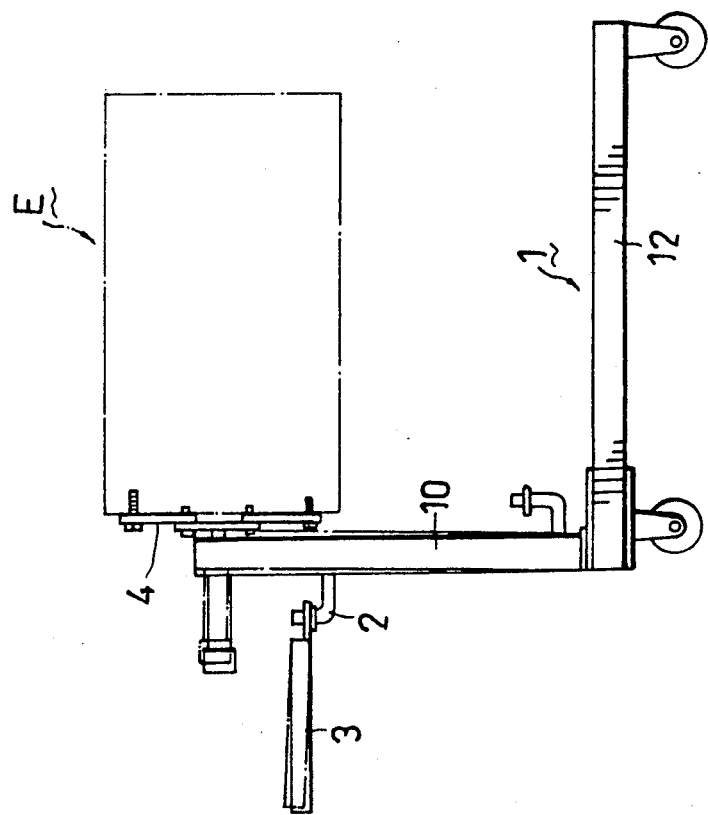
FIG. 2 shows the load carrying wheeled carriage of FIG. 1 carrying a load configuration.
Figure 3:
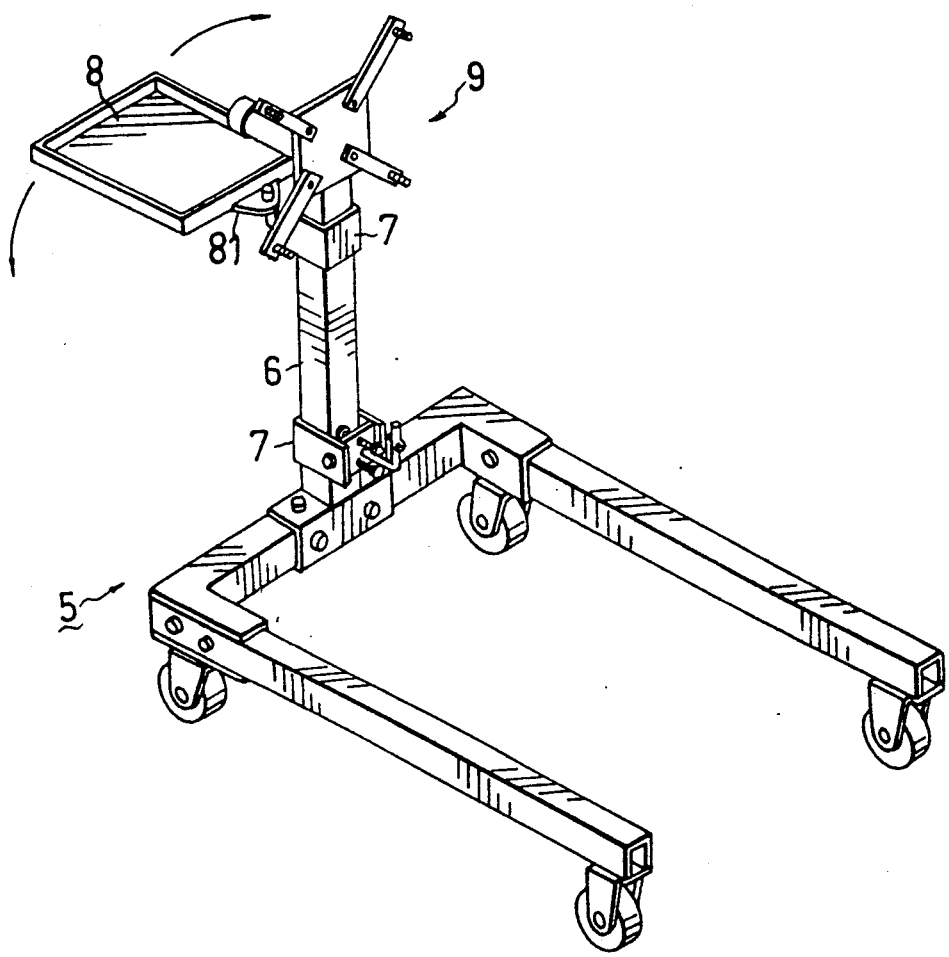
FIG. 3 shows a load carrying wheeled carriage attached with a tray mounting assembly of the present invention.
Figure 4:
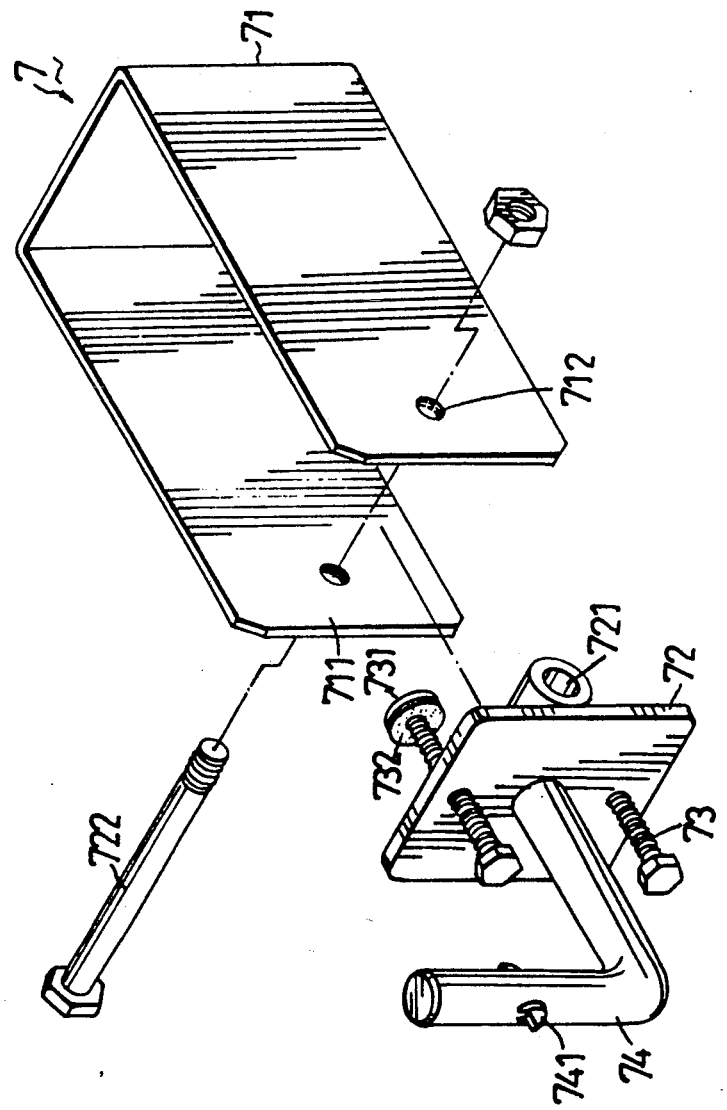
FIG. 4 an exploded view of the tray mounting assembly of the present invention.

Referring to FIGS. 3 and 4, a tray mounting assembly (7) of the present invention to be attached to a load carrying wheeled carriage (5) is shown.

The carriage (5) includes a wheeled base assembly and an upright stand (6) which has a top portion including a rack (9) for carrying a load thereon, such as an engine, which rack is provided above the base assembly in order to facilitate the repair. During repair, some small articles, such as washer rings, springs, nuts and screws are placed in the tray (8) provided on the tray mounting assembly (7), which is in turn adjustably mounted on the upright stand.

The tray mounting assembly (7) includes a substantially U-shaped frame (71) having two free ends (711), each of which has a hole (712) aligned with the other. The U-shaped frame (71) is placed around the upright stand (6) in such a manner that the two free ends (711) of the same protrude beyond a side of the upright stand opposite from the side on which said U-shaped frame is placed. The tray mounting assembly (7) further includes a plate (72) which has a front side with a mounting shaft (74) provided upright therefrom and a rear side on which a lug (721) with a through-hole is provided therethrough. In order to carry a tray, the mounting shaft (74) has two opposite projections (741) extending from the same, as can be seen in FIG. 4. The plate (72) further includes two threaded holes formed thereon, one above and the other below the lug (721) of the same. The lug (721) of the plate (72) is provided between the two free ends (711) of the U-shaped frame (71) in such a manner that the holes of the lug (721) and the free ends (711) of the U-shaped frame (71) are in alignment.

An engaging bolt (722) is inserted into the two holes (712) of the free ends (711) of the U-shaped frame and into the through-hole of the lug (721) of the plate (72) to hold pivotally the former and the latter together.

A pair of threaded bolts (73), each of which has a free end is threaded into the threaded hole of the plate (72) to abut against the upright stand (6), thus holding the U-shaped frame (71) and the plate (72) on the upright stand (6), as shown in FIG. (3).

Figure 5:
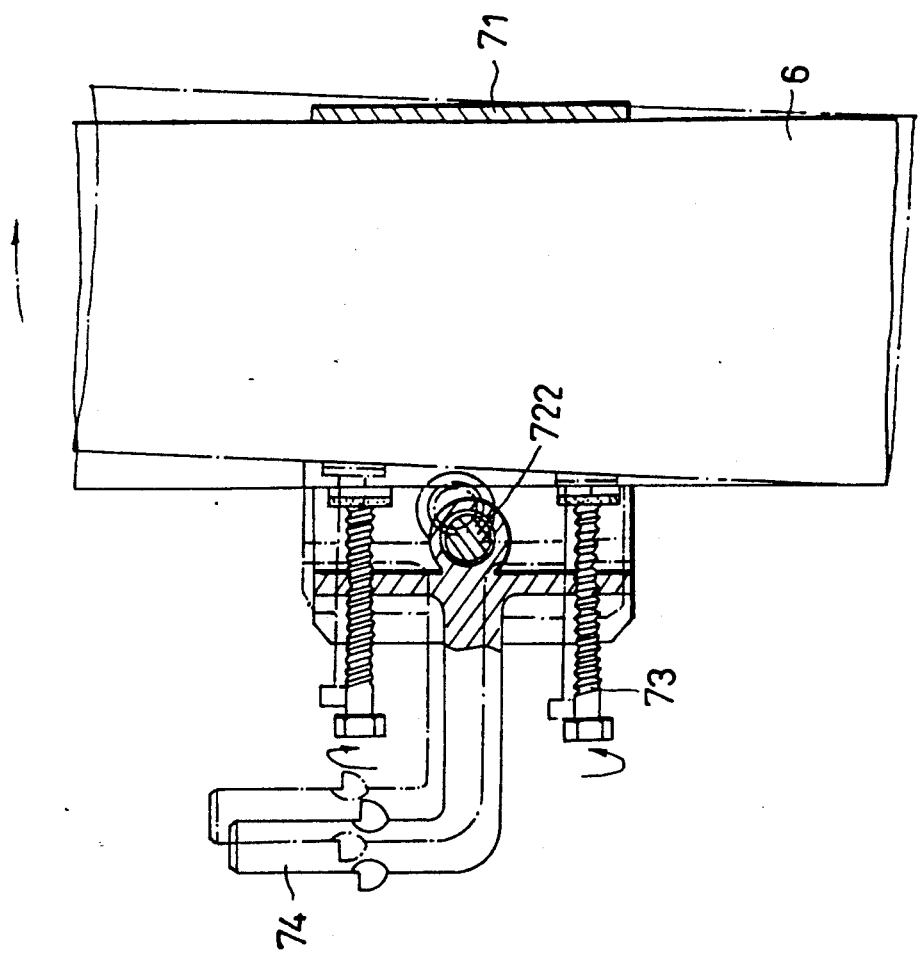
FIG. 5 shows a detailed view of the tray mounting assembly mounted on a stand of the load carrying wheeled carriage.

If a load loaded on the rack (9) of the upright stand is heavy, the upright stand (6) will incline forward, as shown by the phantom in FIG. 5. The mounting shaft (74) will also incline forward. The tray (8) mounted on the projections (741) of the mounting shaft (74) correspondingly inclines forward as shown by the phantom lines. In order to put the tray back in a horizontal plane, i.e., to correct the mounting shaft (74) to be in a vertical position with respect to the inclined upright stand (6), one must turn the upper threaded rod inward while the lower threaded rod is turned outward, as shown by the arrows in FIG. 5. When thus adjusted, the mounting shaft (74) can be placed vertically with respect to the inclined upright stand (6). The tray (8) placed on the mounting shaft (74) will then be in a horizontal plane.

Figure 6:
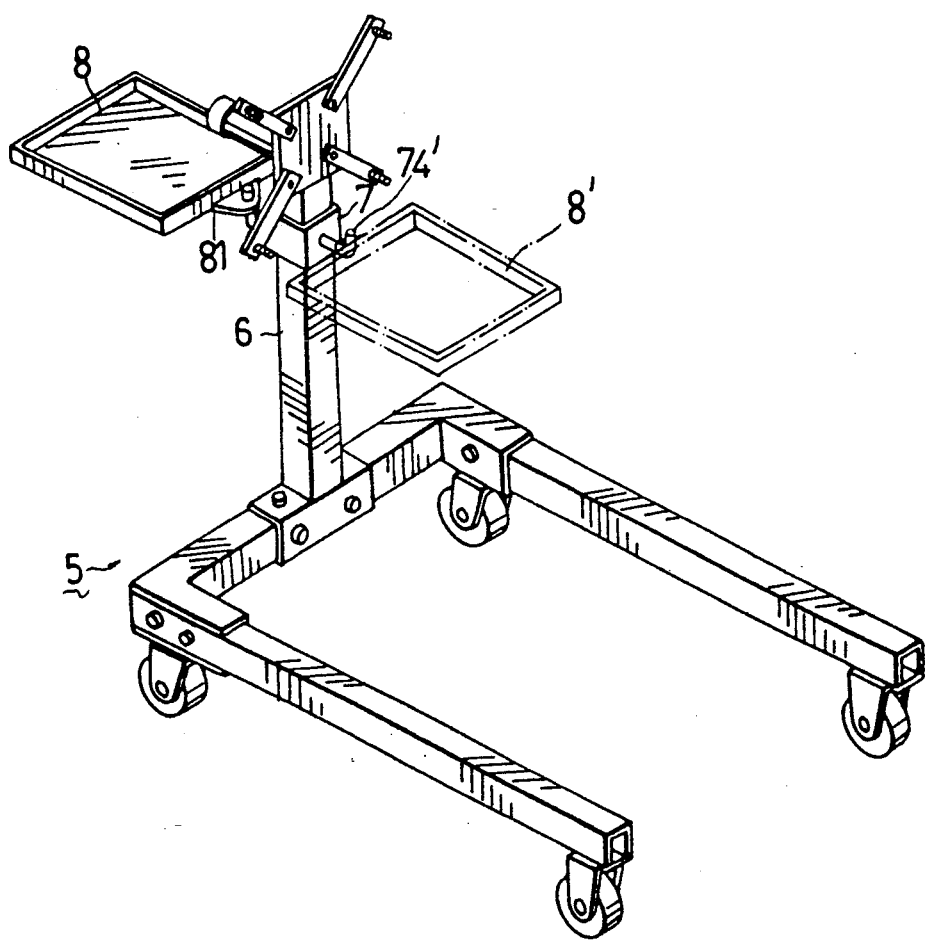
FIG. 6 shows a schematic, perspective view of a load carrying wheeled carriage provided with a tray mounting assembly of the present invention.

Referring to FIG. 6, in another preferred embodiment of the present invention, in order to facilitate repair, an additional mounting shaft (74') can be fixedly welded to the U-shaped frame of the present invention which can carry a tray in a horizontal plane when there is no load carried on the rack of the wheeled carriage.

Once the load is discharged from the wheeled carriage, the upright stand will regain its initial vertical position. The adjusted mounting shaft (74) by then is inclined with respect to the upright stand, unless readjusted to gain a vertical position. In order to save time in adjusting said mounting shaft (74) with respect to the upright stand (6), one can move the tray therefrom and put it on the additional shaft (74') which carries the tray (8') in a horizontal plane as shown by phantom in FIG. (6). Thus, a mechanic who is in a hurry to catch up on repairs can shorten his repairing procedure.

The most important feature of the present invention is the ability to adjust the mounting shaft (74) to be in a vertical position with respect to the inclined upright stand.

With the invention thus explained, it is obvious to those skilled in the art that several modifications and variations can be made without departing from the scope and spirit of the present invention. It is therefore intended that this invention is intended to be limited only in the appended claims.

I claim:

1. A wheeled carriage including an upright stand which has a top portion for carrying a load on one side of said top portion and a mounting device provided adjacent to said top portion thereof, said mounting device including a shaft for holding a tray thereon;

characterized in that said mounting device includes a substantially U-shaped frame having two free ends provided around said upright stand in such a manner that said two free ends protrude beyond said upright stand;

a plate having an outside face from which said mounting shaft extends upward, an inside face and a pair of threaded holes formed through said plate, said plate being pivotally connected to said two free ends of said U-shaped frame and said inside face of said plate having a pivot point, one of said threaded holes being above and the other one being below said pivot point; and a pair of threaded rods each of which has a free end which is threaded into each of said threaded holes of said plate to abut against said upright portion.

2. A wheeled carriage as claimed in claim 1, characterized in that a padding ring can be provided at said free end of said threaded rod.

3. A wheeled carriage as claimed in claim 1, characterized in that said inner wall of said plate includes a lug with a through-hole, and each of said free ends of said U-shaped frame has a hole aligned with the other.

4. A wheeled carriage as claimed in claim 1, characterized in that said mounting device further includes an additional mounting shaft fixedly provided on said U-shaped frame, which can carry said tray in a normal horizontal position.

* * * * *